(12) United States Patent
Zanetti et al.

(10) Patent No.: US 10,352,751 B2
(45) Date of Patent: Jul. 16, 2019

(54) CONTROL APPARATUS FOR DETECTING A VARIATION OF A FLUID LEVEL IN A TANK

(71) Applicant: GM GLOBAL TECHNOLOGY OPERATIONS LLC, Detroit, MI (US)

(72) Inventors: Igor Zanetti, Verrayes (DE); Giovanni David, Torino (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 591 days.

(21) Appl. No.: 14/446,060

(22) Filed: Jul. 29, 2014

(65) Prior Publication Data

US 2015/0032391 A1   Jan. 29, 2015

(30) Foreign Application Priority Data

Jul. 29, 2013 (GB) .................................. 1313479.6

(51) Int. Cl.
  *G01F 23/00* (2006.01)
  *G01F 23/74* (2006.01)
(52) U.S. Cl.
  CPC .......... *G01F 23/0069* (2013.01); *G01F 23/74* (2013.01)
(58) Field of Classification Search
  CPC ...... G01F 23/0069; G01F 23/74; G01F 23/70; F01N 2610/02; F01N 3/2066; F01N 2900/1814
  See application file for complete search history.

(56) References Cited

U.S. PATENT DOCUMENTS

| 5,195,466 A | 3/1993 | Schulte et al. |
| 5,394,344 A * | 2/1995 | Lippmann ........... G01F 23/0069 340/450.2 |
| 5,408,418 A | 4/1995 | Lippmann et al. |
| 2008/0143345 A1 | 6/2008 | Boudaoud et al. |
| 2013/0006548 A1 * | 1/2013 | Zanetti .................... G01F 23/74 702/55 |
| 2013/0055700 A1 * | 3/2013 | Minezawa .............. F01N 3/208 60/277 |
| 2013/0160541 A1 * | 6/2013 | Medina-Sanchez .... G01F 23/22 73/305 |

(Continued)

FOREIGN PATENT DOCUMENTS

| DE | 4425018 C1 | 6/1995 |
| DE | 10162269 A1 | 7/2003 |

(Continued)

*Primary Examiner* — Jennifer E Simmons
*Assistant Examiner* — Leo T Hinze (57) ABSTRACT

A control apparatus for detecting a variation of a fluid level in a tank is disclosed. The control apparatus includes an Electronic Control Unit connected to the fluid level sensor. The ECU is configured to monitor a signal value representative of a fluid level in the tank; filter the fluid level signal value using a first filter to obtain a first filtered signal and using a second filter to obtain a second filtered signal, the first filter having a time constant ($\tau 1$) lower than a time constant ($\tau 2$) of the second filter; calculate an integral value of a difference between the first filtered signal and the second filtered signal; and generate a signal representative of the detection of an increase in the fluid level in the tank when the integral value is greater than a predefined threshold.

9 Claims, 7 Drawing Sheets

(56) References Cited

U.S. PATENT DOCUMENTS

2015/0019108 A1\* 1/2015 Hendrickson .......... F01N 11/00
                                                                               701/102

FOREIGN PATENT DOCUMENTS

| | | |
|---|---|---|
| DE | 10300760 A1 | 8/2003 |
| JP | 6447115 A | 2/1989 |
| WO | 9521368 A1 | 8/1995 |

\* cited by examiner

CONTROL APPARATUS FOR DETECTING A VARIATION OF A FLUID LEVEL IN A TANK

CROSS REFERENCE TO RELATED APPLICATION

This application claims priority to GB Patent Application No. 1313479.6 filed Jul. 29, 2013, which is incorporated herein by reference in its entirety.

TECHNICAL FIELD

The technical field relates to a control apparatus for detecting a variation of a fluid level in a tank.

BACKGROUND

Internal combustion engines are associated with after treatment systems due to stringent emissions regulation. An after treatment system may include one or more after treatment devices provided in an exhaust system of the internal combustion engine. Among these devices, a SCR device or Selective Catalytic Reduction device in which the nitrogen oxides ($NO_x$) contained in the exhaust gas are reduced into diatomic nitrogen ($N_2$) and water ($H_2O$), with the aid of a gaseous reducing agent, typically ammonia ($NH_3$) that can be obtained by urea ($CH_4N_2O$) thermo-hydrolysis and that is absorbed inside catalyst.

Typically, urea is contained in a dedicated tank, is injected in the exhaust line and mixed with the exhaust gas upstream of the SCR device. Other fluids can be used in an SCR device in lieu of urea and are generally referred to as Diesel Exhaust Fluids (DEF).

More generally, internal combustion engines are conventionally equipped with a variety of fluid tanks, for example a fuel tank or the above mentioned urea or DEF tank for the SCR exhaust gas treatment system, for which it is desirable to monitor the level of the fluid contained within. Continuous fluid level sensors have widely been used for detecting the level of fluid in a tank. These sensors work by continuously measuring a level within a specified range and determining the exact amount of fluid in the tank as a function of the measured level. Unfortunately these sensors are relatively expensive.

As an alternative to continuous sensors, discrete level sensors may also be used. Discrete level sensors provide information on the level of fluid in the tank by simply indicating whether the fluid in the tank is above or below predetermined level threshold values. Discrete level sensors are therefore less precise since they are unable to detect the precise level of fluid between two level threshold values.

Moreover, when used in internal combustion engines they present additional problems. During transitory driving states of the vehicle, i.e. for example during acceleration or deceleration, discrete level sensors provide level indication which are often misleading. In those situations the fluid in the tank is sloshed around and the level threshold values are randomly exceeded so that the sensor provides conflicting information regarding the actual level of the fluid in the tank. This is even more true when the discrete level sensors are used for example to detect the level of urea in urea tanks. Such tanks normally have a relatively flat and wide parallelepiped shape and small movements of the vehicle are enough to cause the fluid to slosh in the tank and to randomly exceed or fall below various threshold level values.

It is also important to note that, in connection with the use of an SCR device, in case of low level of DEF in the tank, warnings are displayed to the driver, for example the information of the remaining distance that the vehicle can travel. Also, on the basis of the remaining DEF quantity, some inducement actions may be activated. Inducement action may include vehicle speed performance limitation that is annoying to the driver and, if the DEF quantity is lower than a predefined threshold, engine restart prevention. These inducement actions are designed to avoid the use of the vehicle and induce the driver to refill the DEF tank. Furthermore, current legislation requires that all warnings and inducement actions can be switched off only in case the customer does a tank refill. Therefore an SCR system equipped with a DEF tank and a level sensor must be able to detect if a refill has been done, in order to disable all inducement strategies for the driver.

SUMMARY

In accordance with the present disclosure a method and a device is provided that allows not only to detect if a refill has been performed, but also the new quantity of fluid present in the tank by means of a simple, rational and inexpensive solution. An embodiment of the present disclosure provides a control apparatus for detecting a variation of a fluid level in a tank, the tank being equipped with a fluid level sensor. The control apparatus includes an Electronic Control Unit connected to the fluid level sensor and configured to monitor a signal value representative of a fluid level in the tank; filter the fluid level signal value using a first filter to obtain a first filtered signal and using a second filter to obtain a second filtered signal, the first filter having a time constant lower than a time constant of the second filter; calculate an integral value of a difference between the first filtered signal and the second filtered signal; and generate a signal representative of the detection of an increase in the fluid level in the tank when the integral value is greater than a predefined threshold.

The above embodiment of the present disclosure has several advantages. First it gives the possibility to take into account all the history of the level sensor performance in a current driving cycle. The above embodiment also gives the possibility to detect a tank refill at any time of the current driving cycle, in particular when the fluid level sensor is stuck while the customer is refilling the tank. Level sensors can be mechanically stuck due to frozen liquid in the tank (i.e. a generally known DEF fluid freezes at −11° C.), or due other causes correlated to the kind of the level sensor i.e. fluid crystals could be a cause of a level sensor floater stuck.

The same approach can be used to detect a level sensor stuck condition in order to activate proper remedial action setting a Diagnostic Trouble Code (DTC) in the Electronic Control Module (ECM) of the engine. If the floater is stuck at any position, the integral value calculated is equal to zero: in general, due to the DEF sloshing phenomenon, the integral should change assuming also values different from zero.

According to another embodiment of the present disclosure, the Electronic Control Unit is configured to generate the signal representative of the detection of an increase in the fluid level in the tank when the integral value is greater than the predefined threshold for a predetermined interval of time. An advantage of this embodiment is that it allows to generate the signal representative of the detection of an increase in the fluid level in the tank only in case that the Electronic Control Unit has detected a refill in a stable way.

According to another embodiment of the present disclosure, the Electronic Control Unit is configured to initiate a learning procedure in order to learn a new fluid level value in the tank using the value of the monitored second filtered signal if an increase in the fluid level in the tank is detected. An advantage of this embodiment is that it provides a criterion to determine an optimal condition for learning a new value of the level of the fluid in the tank.

Another embodiment of the present disclosure provides a control apparatus, wherein the Electronic Control Unit is configured to perform the learning procedure by monitoring the second filtered signal; calculating an absolute value of the difference between the first filtered signal and the second filtered signal; and setting the monitored second filtered signal as a new fluid level value in the tank when the absolute value is lower than a predefined threshold thereof. An advantage of this embodiment is that it provides a criterion to determine a new value of the level of the fluid in the tank According to another embodiment of the present disclosure, the Electronic Control Unit is configured to set the monitored second filtered signal as a new fluid level value in the tank learned if the absolute value is lower than a predefined threshold thereof for a predetermined interval of time. An advantage of this embodiment is that it is allowed to learn the new value of the level of the fluid in the tank only in case that the Electronic Control Unit has detected a stable measure of the level.

An aspect of the present disclosure provides a method of detecting a variation of a fluid level in a tank, the tank being equipped with a fluid level sensor, the control apparatus including an Electronic Control Unit connected to the fluid level sensor and configured to monitor a signal value representative of a fluid level in the tank; filter the fluid level signal value using a first filter to obtain a first filtered signal and using a second filter to obtain a second filtered signal, the first filter having a time constant lower than a time constant of the second filter; calculate an integral value of a difference between the first filtered signal and the second filtered signal; and generate a signal representative of the detection of an increase in the fluid level in the tank when the integral value is greater than a predefined threshold.

Among the advantage of the above embodiment of the present disclosure, there is the possibility to take into account all the history of the level sensor performance in a current driving cycle. The above embodiment also gives the possibility to detect a tank refill at any time of the current driving cycle, when the fluid level sensor is stuck while the customer is refilling the tank. Level sensors can be mechanically stuck due to frozen liquid in the tank (i.e. a generally known DEF fluid freezes at −11° C.), or due other causes correlated to the kind of the level sensor i.e. fluid crystals could be a cause of a level sensor floater stuck.

The same approach can be used to detect a level sensor stuck condition in order to activate proper remedial action setting a Diagnostic Trouble Code (DTC) in the Electronic Control Module (ECM) of the engine. If the floater is stuck at any position, the integral value calculated is equal to zero: in general, due to the DEF sloshing phenomenon, the integral should change assuming also values different from zero.

According to another embodiment of the present disclosure, the method includes the step of generating the signal representative of the detection of an increase in the fluid level in the tank, if the integral value is greater than the predefined threshold for a predetermined interval of time. An advantage of this embodiment is that it allows to generate the signal representative of the detection of an increase in the fluid level in the tank only in case that the Electronic Control Unit has detected a refill in a stable way.

According to another embodiment of the present disclosure, the method includes initiating a learning procedure in order to learn a new fluid level value in the tank using the value of the monitored second filtered signal, if an increase in the fluid level in the tank is detected. An advantage of this embodiment is that it provides a criterion to determine an optimal condition for learning a new value of the level of the fluid in the tank.

Another embodiment of the present disclosure provides a method having the steps of performing the learning procedure by monitoring the second filtered signal; calculating an absolute value of the difference between the first filtered signal and the second filtered signal; and setting the monitored second filtered signal as a new fluid level value in the tank when the absolute value is lower than a predefined threshold thereof. An advantage of this embodiment is that it provides a criterion to determine a new value of the level of the fluid in the tank.

According to another embodiment of the present disclosure, the method includes the step of setting the monitored second filtered signal as a new fluid level value in the tank learned if the absolute value is lower than a predefined threshold thereof for a predetermined interval of time. An advantage of this embodiment is that it is allowed to learn the new value of the level of the fluid in the tank only in case that the Electronic Control Unit has detected a stable measure of the level.

Another aspect of the present disclosure provides an apparatus for detecting a variation of a fluid level in a tank, the tank being equipped with a fluid level sensor, the control apparatus including an Electronic Control Unit connected to the fluid level sensor and configured to monitor a signal value representative of a fluid level in the tank; filter the fluid level signal value using a first filter to obtain a first filtered signal and using a second filter to obtain a second filtered signal, the first filter having a time constant lower than a time constant of the second filter; calculate an integral value of a difference between the first filtered signal and the second filtered signal; and generate a signal representative of the detection of an increase in the fluid level in the tank when the integral value is greater than a predefined threshold. The above embodiment of the present disclosure has substantially the same advantages of the control apparatus and of the method.

According to another embodiment of the present disclosure, the apparatus includes means for generating the signal representative of the detection of an increase in the fluid level in the tank, if the integral value is greater than the predefined threshold for a predetermined interval of time. An advantage of this embodiment is that it allows to generate the signal representative of the detection of an increase in the fluid level in the tank only in case that the Electronic Control Unit has detected a refill in a stable way.

According to another embodiment of the present disclosure, the apparatus includes means for initiating a learning procedure in order to learn a new fluid level value in the tank using the value of the monitored second filtered signal, if an increase in the fluid level in the tank is detected. An advantage of this embodiment is that it provides a criterion to determine an optimal condition for learning a new value of the level of the fluid in the tank.

Another embodiment of the present disclosure provides an apparatus including means for monitoring the second filtered signal; means for calculating an absolute value of the difference between the first filtered signal and the second filtered signal; and means for setting the monitored second filtered signal as a new fluid level value in the tank, if the absolute value is lower than a predefined threshold thereof. An advantage of this embodiment is that it provides a criterion to determine a new value of the level of the fluid in the tank According to another embodiment of the present disclosure, the apparatus includes means for setting the monitored second filtered signal as a new fluid level value in the tank learned if the absolute value is lower than a predefined threshold thereof for a predetermined interval of time. An advantage of this embodiment is that it is allowed to learn the new value of the level of the fluid in the tank only in case that the Electronic Control Unit has detected a stable measure of the level.

According to another aspect of the present disclosure, the tank is a Diesel Exhaust Fluid tank. The method according to one of its aspects can be carried out with the help of a computer program including a program-code for carrying out all the steps of the method described above, and in the form of computer program product including the computer program.

The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out. A still further aspect of the disclosure provides an internal combustion engine specially arranged for carrying out the method claimed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
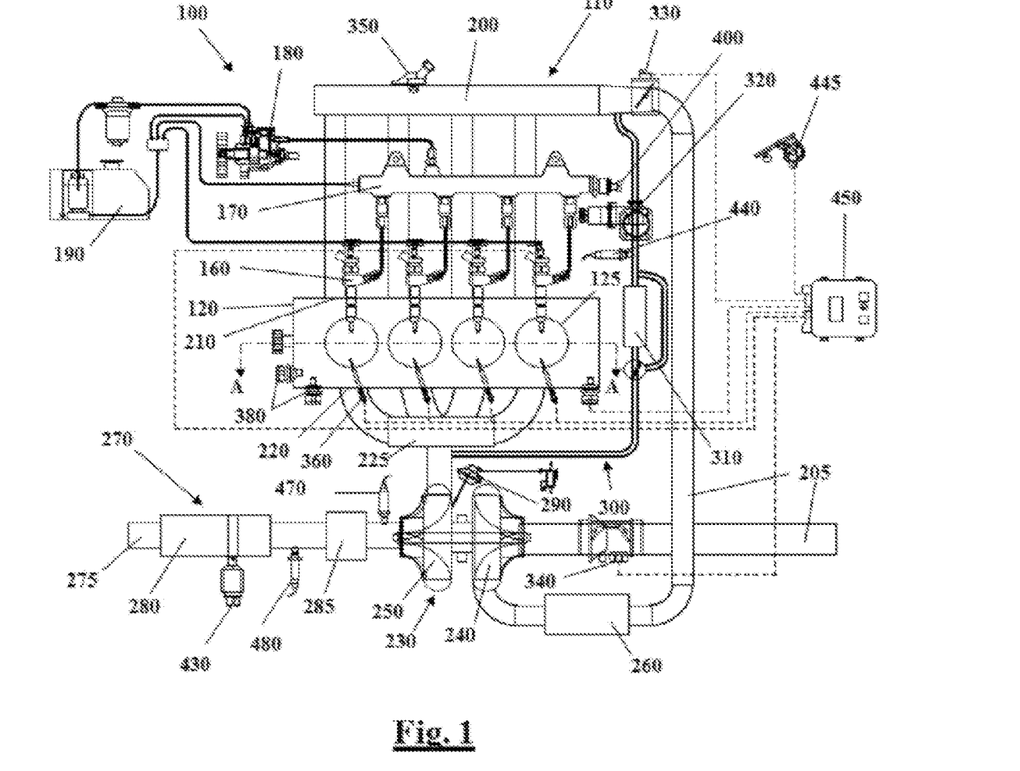
FIG. 1 shows an automotive system.
Figure 2:
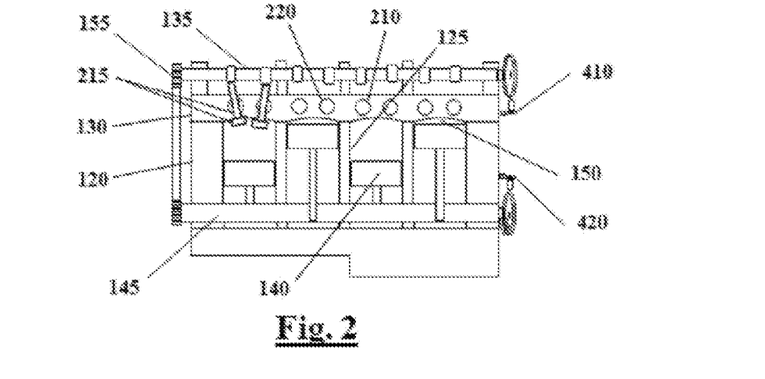
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The after treatment device may be any device configured to change the composition of the exhaust gases. Some examples of aftertreatment devices 280,285 include, but are not limited to, catalytic converters (two and three way), oxidation catalysts, lean NOx traps, hydrocarbon adsorbers, selective catalytic reduction (SCR) systems 285, and particulate filters.

Figure 3:
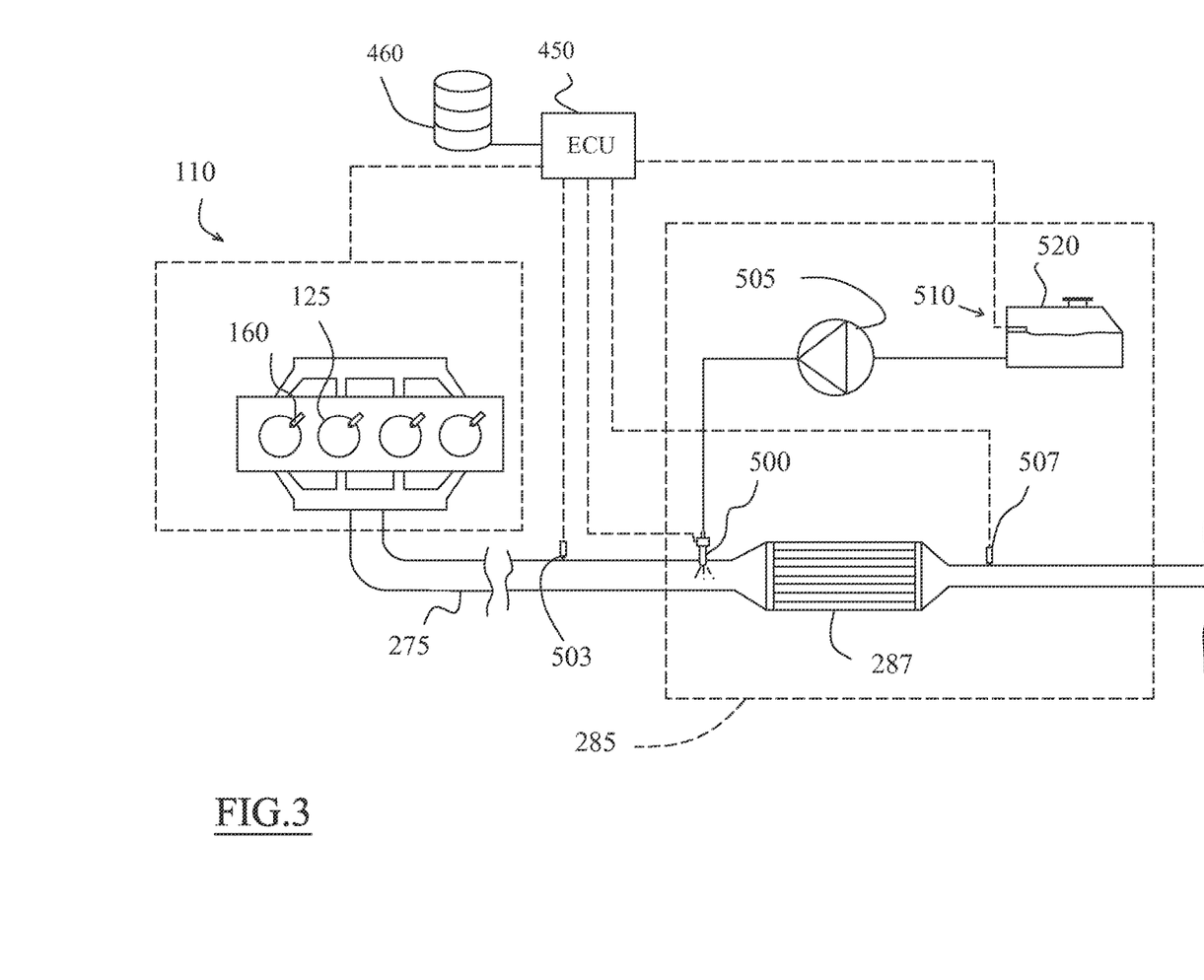
FIG. 3 represents schematically a portion of an after treatment system of the automotive system of FIGS. 1-2.

In FIG. 3 a portion of an aftertreatment system equipped with a selective catalytic reduction (SCR) system 285 is described in more detail.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and sends and receives signals to/from the interface bus. The memory system may include various storage types including optical storage, magnetic storage, solid-state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible computer-readable storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

In FIG. 3 a selective catalytic reduction (SCR) system 285 is represented, the SCR system 285 being provided with a SCR catalyst 287 in the exhaust pipe 275 of the exhaust system 270 of the internal combustion engine 110. The SCR catalyst 287 can be fed with a Diesel Exhaust Fluid (DEF), for example urea, that is stored in a DEF tank 520, in order to reduce the nitrogen oxides ($NO_x$) contained in the exhaust into diatonic nitrogen ($N_2$) and water ($H_2O$).

The DEF is provided to a DEF injector 500 by means of a DEF pump 505 that receives the DEF from the DEF tank 520. The DEF injector 500 can be controlled by the ECU 450 of the automotive system 100.

The ECU can calculate appropriate energizing times ET_Inj of the DEF injector 500 in order to inject a requested mass of DEF into the exhaust gas stream upstream of the SCR catalyst 287. The exhaust pipe 275 may also be equipped with a $NO_x$ sensor 503 upstream of the SCR catalyst 287 and with a NOx sensor 507 downstream of the SCR catalyst 287, in order to provide data to the ECU on the operation of the SCR catalyst 287.

Any fluid tank associated with the operations of the internal combustion engine 110, such as the fluid source 190 or the above-described DEF tank 520 associated to the SCR catalyst 287, can be equipped with discrete or continuous level sensors.

In case of discrete level sensors, the fluid level in the tank is generally sensed by obtaining a discrete indication, such as an electrical signal, whenever a predetermined threshold value has been reached, for example whenever the quantity of fluid in the tank exceed a predetermined quantity. Fluid level sensors make use of various kinds of float operated mechanisms, resistance mechanisms, capacitive mechanisms, and acoustic mechanisms. A commonly used fluid level sensor is a magnetic float sensor, which is very popular because of its simplicity, dependability and low cost. An example of a magnetic float discrete level sensor will now be described in more details with reference to FIG. 4 which is a schematic representation of the DEF tank 520, equipped with such a sensor 510.

Figure 4:
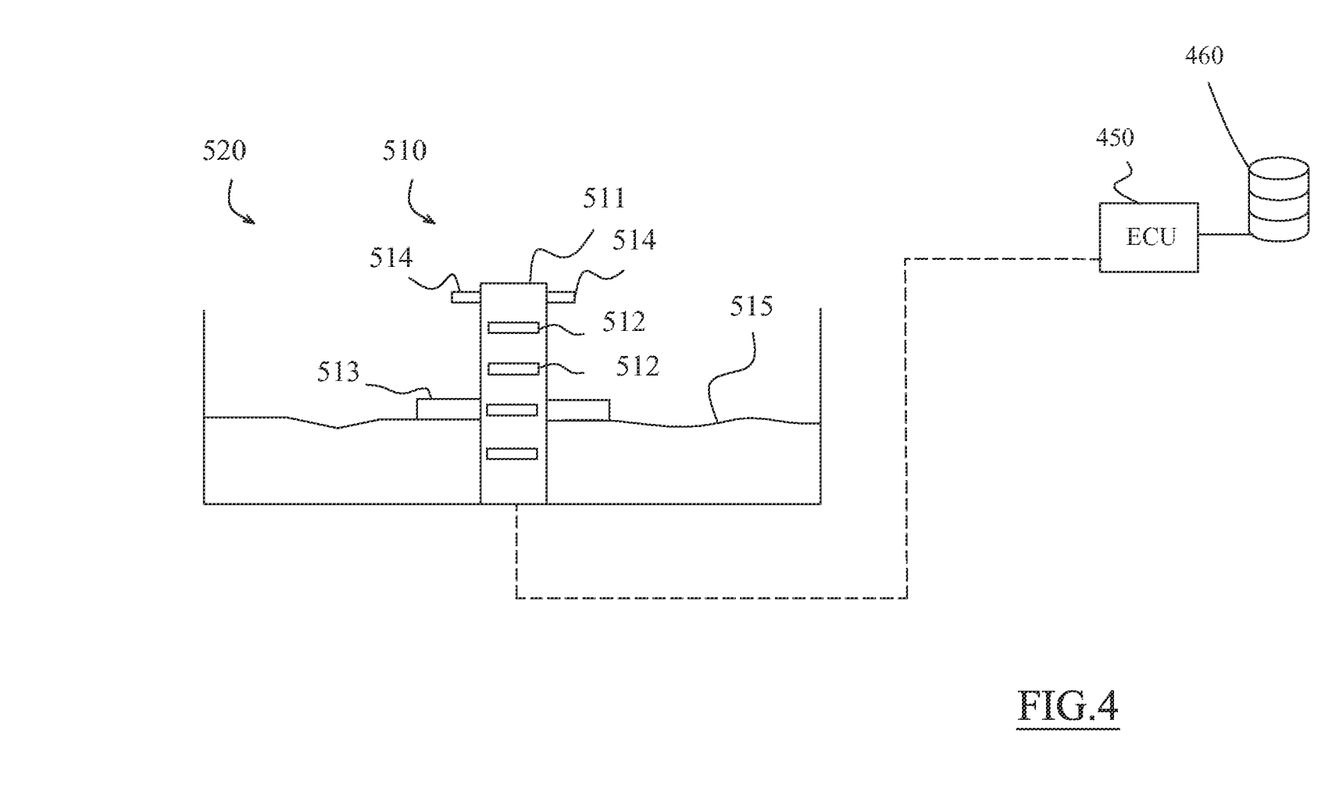
FIG. 4 is a schematic representation of a fluid tank equipped with a discrete level sensor.

The sensor 510 includes a magnetic float 513, annularly shaped, movably supported on an exterior of a tube 511. The float 513 is adapted to be buoyant in the fluid or liquid and to move upwards and downwards along the tube with changing the fluid level 515 in the tank 500. A stop element 514 is located at the top of the tube 511 to stop the magnetic float 513 from being detached from the sensor 510. The sensor 510 further includes a switch assembly 512 supported inside the tube 511. The switch assembly 512 includes a plurality of switches, each located at a different position along the tube 511, each adapted to be magnetically activated when the magnetic float 513, moving along the length of the tube 511, reaches its level position. Each switch therefore corresponds to a fluid level threshold value in the tank.

In FIG. 4 four fluid level threshold values are represented, but the sensors can include from two to a plurality of switches and corresponding threshold level values. The switch assembly 512 also includes a plurality of resistors, each resistor in parallel to a switch. Whenever a switch is actuated the corresponding resistor is bypassed. A constant voltage, for example 5V, is applied to the switch assembly 512 via a constant voltage generator (not shown). The switch assembly 512 is then connected to the ECU 450, which is configured to receive an electrical signal from the sensor 510, for example a percentage of the voltage value applied to the sensor 510, which is a function of the number of bypassed resistors i.e. of the number of actuated switches.

When the fluid in the tank 520 reaches a certain quantity corresponding to a level threshold value, the magnetic actuates the corresponding switch and a corresponding electrical signal is generated and sent to the ECU 450. If the fluid in the fluid tank 500 is calm the magnetic float 513 is also stable along the tube 511 and the signal received by the ECU 450 is constantly the same until the level of fluid changes.

Both in case of a discrete level sensor (such as the one of FIG. 4), or of a continuous level sensor, the measured fluid level is a function of a raw signal, expressed in percentages of tank volume by a variable level_raw_signal coming from the sensor 510. A conversion table (not represented for simplicity) is employed to convert such value in a fluid level signal level, expressed for example in liters, according to a known function:

level=*f*(level_raw_signal).

Figure 5:
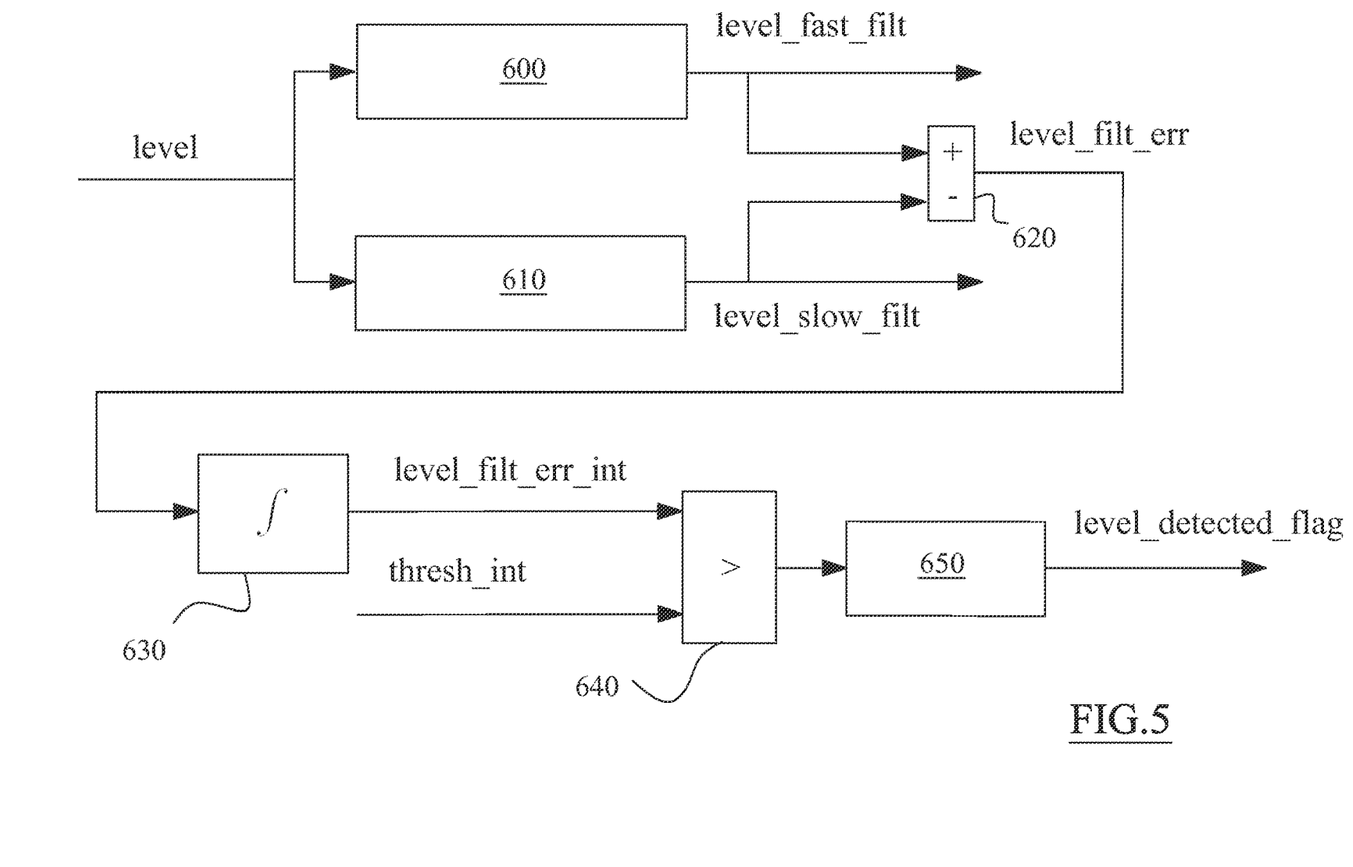
FIG. 5 represents a flowchart describing the logic of an embodiment of the present disclosure.

FIG. 5 represents a flowchart describing the steps of an embodiment of the present disclosure. According to this embodiment, the fluid level signal level, converted from the sensor signal level_raw_signal, is subjected to two different filtering operations employing different filtering dynamics. The principle of operation is to filter the same fluid level value level twice in order to obtain to different filtered signals, namely a first filtered signal level_fast_filt and a second filtered signal level_slow_filt, the above filtering operations being performed in parallel. The first filtered signal level_fast_filt is obtained using a first filter 600 having a first time constant $\tau 1$ and the second filtered signal level_slow_filt is obtained using a second filter 610 having a second time constant $\tau 2$ different from the first time constant $\tau 1$ (block 610).

The second time constant $\tau 2$ is chosen in such way that the fluid level signal level is more filtered by the second filter 610 than by the first filter 600. In other words, the second filtered signal level_slow_filt is smoother than the first filtered signal level_fast_filt. In order to perform such filtering operations, any type of known filtering technique may be used, such as for example exponential filtering. In case of exponential filtering, the first time constant $\tau 1$ has a lower value with respect to the second time constant $\tau 2$.

The output of the first filter 600, namely the first filtered signal level_fast_filt, is close to the original fluid level signal level, while the output of the second filter 610, namely the second filtered signal level_slow_filt is used to filter too rapid oscillations of the fluid level signal level. A difference (block 620) is then performed between the first filtered signal level_fast_filt and the second filtered signal level_slow_filt in order to obtain a variable level_filt_err correlated to a change in the fluid level in the tank 520. The variable level_filt_err is then integrated with respect to time (block 630) in order to calculate a variable level_filt_err_int representative of the history of the tank fluid level values, in symbols:

level_filt_err_int=$\int_0^\infty$level_filt_err($t$)

The value of the variable level_filt_err_int is then compared (block 640) with a predetermined threshold value thereof thresh_int and, if such value is greater than the predetermined threshold value thresh_int, a change of level in the tank is detected and is expressed by setting a positive value for a Boolean variable level_detected_flag. In order to clear up the detection of a change of fluid level in the tank from possible rapid oscillations, a debouncing procedure (block 650) is employed, for example by changing the status of the level_detected_flag Boolean variable only if the level_filt_err_int variable is greater than the threshold for a predetermined interval of time.

Figure 6:
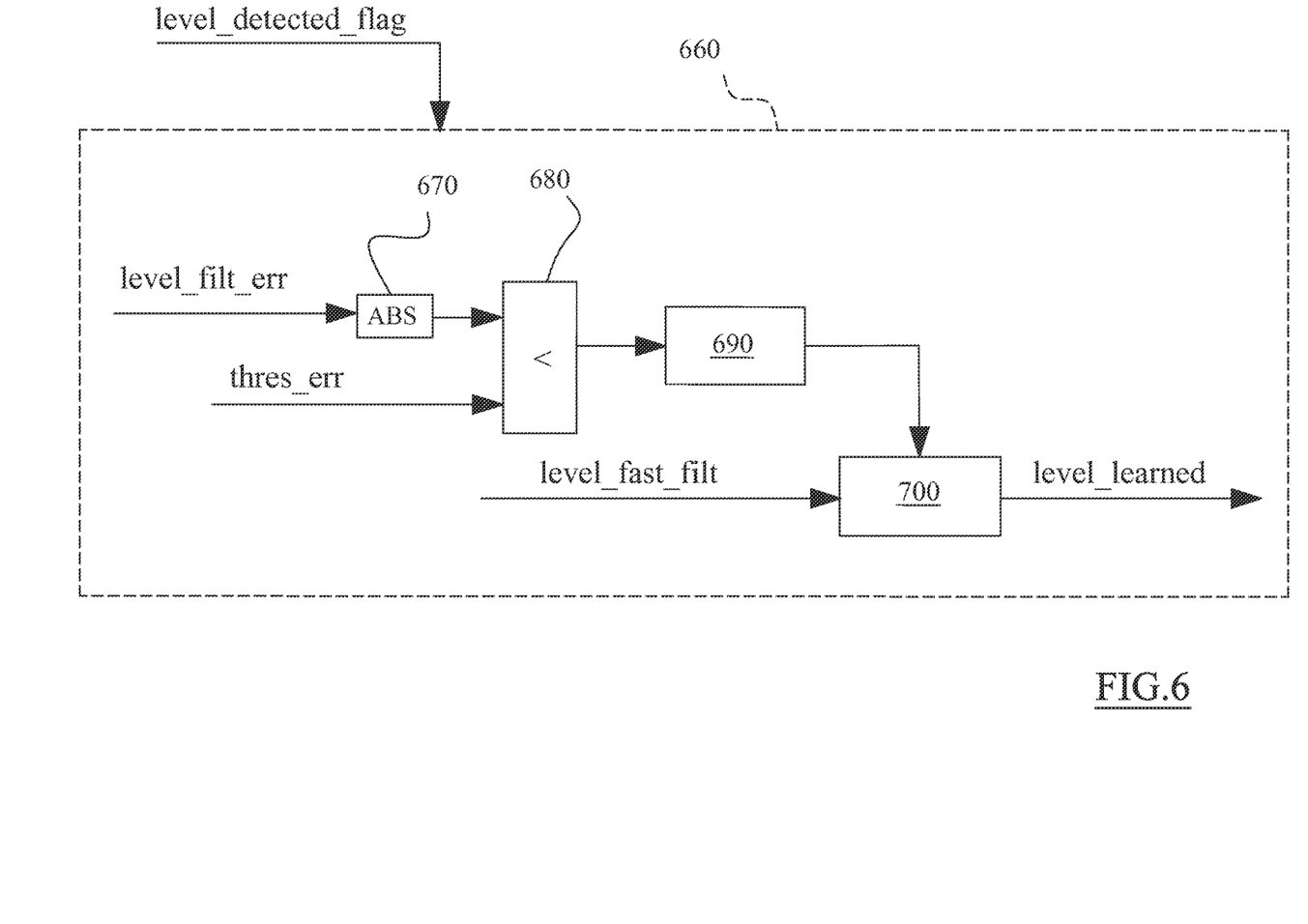
FIG. 6 represents a flowchart describing the logic of another embodiment of the present disclosure.

According to another embodiment of the present disclosure, the actual level of the fluid in the tank can be learned as described schematically in the flowchart of FIG. 6. In this case, if the level_detected_flag Boolean variable is positive, namely if a change in the level of the fluid in the tank is detected according to above described procedure, a level learning strategy (block 660) is activated. In the level learning strategy, first the absolute value of the level_filt_err variable, correlated to a change in the fluid level in the tank, is calculated (block 670). At the same time, the second filtered signal level_fast_filt is monitored.

The absolute value of the level_filt_err variable is then compared with a threshold value thereof thresh_err (block 680) and if it is lower than this threshold value, then the fast filtered signal value level_fast_filt is considered as the new level learned (block 700) and is stored in the variable level_learned. Also in this case, a debouncing procedure (block 690) may be employed, for example by storing the new level learned in the variable level_learned only if the absolute value level_filt_err is lower than the threshold value thresh_err for a predetermined interval of time.

Figure 7:
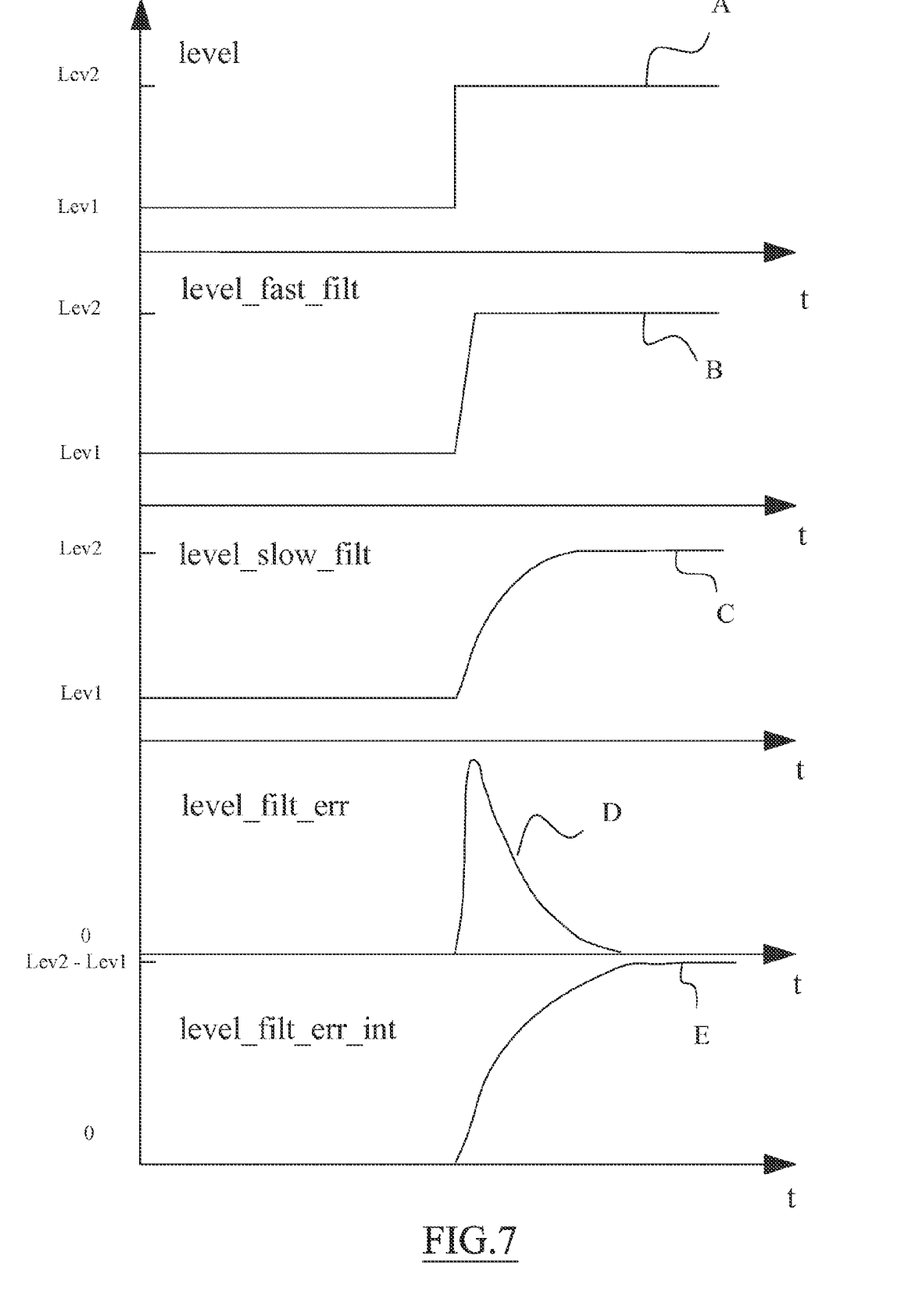
FIG. 7 represents a graph of an exemplary application of an embodiment of the present disclosure.

FIG. 7 represents a graph of an exemplary application of an embodiment of the present disclosure, namely an example of tank fluid level variation detection. This may be representative of a situation in which the tank fluid level is incremented from a first value Lev1 to a second value Lev2 (curve A), whereby the second value Lev2 is greater than the first value Lev1, for example as a consequence of an user's refill of the DEF tank with a certain quantity of DEF fluid. Then this embodiment of the present disclosure filters the level signal value level coming from the fluid level sensor 510 in the tank using a filter with a first time constant $\tau 1$, obtaining a first filtered signal value level_fast_filt (curve B) and using another filter with a second time constant $\tau 2$, obtaining a second filtered signal value level_fast_filt (curve C).

Then a difference is performed between the first filtered signal level_fast_filt and the second filtered signal level_slow_filt, in order to obtain the variable correlated to the change in the fluid level in the tank level_filt_err (curve D). Finally the variable representative of the change in the fluid level in the tank level_filt_err is integrated with respect to time in order to calculate the variable representative of the history of the tank fluid level values level_filt_err_int (curve E), which shows an increment from zero (no change in the fluid level detected) to a value Lev2−Lev1 that represents the increment of level in the tank 520.

Figure 8:
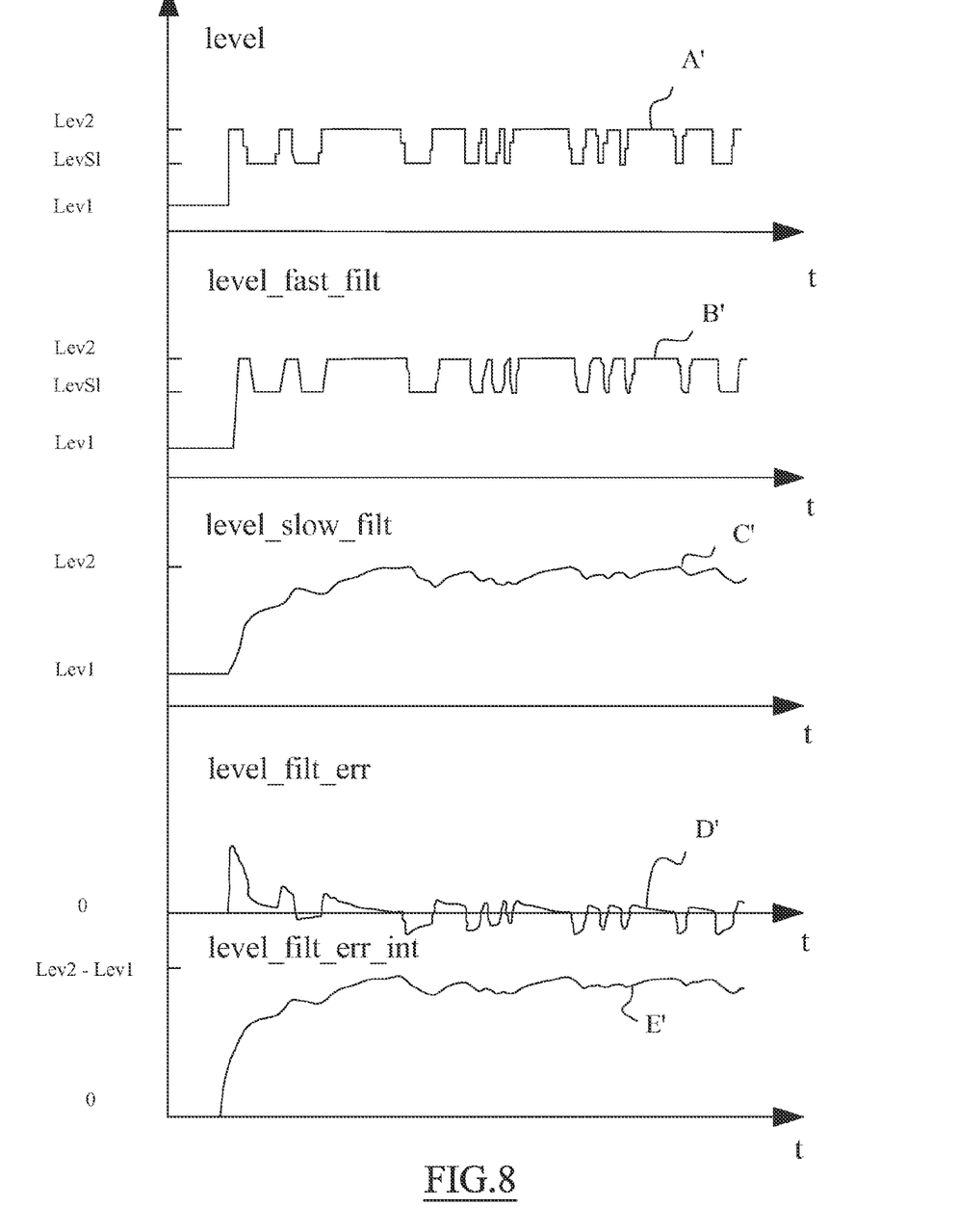
FIG. 8 represents a graph of a second exemplary application of an embodiment of the present disclosure.

FIG. 8 represents a graph of a second and more realistic exemplary application of an embodiment of the present disclosure, namely an example of tank fluid level variation detection combined with a sloshing phenomenon due to the movement of the vehicle. As it is known, in fluid dynamics, slosh refers to the movement of fluid inside another object, such as a tank, which is typically also undergoing motion. The graph of FIG. 8 represents therefore a situation in which, after a refill, the fluid level sensor is stuck for a certain time at a first value Lev1, for example because of freezing of the fluid due to low external temperatures. After a certain amount of time, the fluid thaws and the sensor is unstuck and able to measure a second value Lev2, whereby the value Lev2 is greater than the value Lev1.

Furthermore, the fluid in the tank is subjected to a sloshing phenomenon that has the consequence that the level signal level, measured by the fluid level sensor 510, oscillates between value Lev2 and lower value LevSl determined by the sloshing phenomenon (curve A'). This rapidly varying signal is then filtered using a filter with a first time constant $\tau 1$, obtaining a first filtered signal value level_fast_filt (curve B') and using another filter with a second time constant $\tau 2$, obtaining a second filtered signal value level_fast_filt (curve C'). Then a difference is performed between the fast filtered signal level_fast_filt and the slow filtered signal level_slow_filt, in order to obtain the variable correlated to the change in the fluid level in the tank level_filt_err (curve D'). Finally the variable representative of the change in the fluid level in the tank level_filt_err is then integrated with respect to time, in order to calculate the variable representative of the history of the tank fluid level values level_filt_err_int (curve E').

Even if the various embodiments of the present disclosure have been described primarily in relation to a DEF tank 520, the skilled person would recognize that the various embodiments of the present disclosure can be applied to any tank provided with a fluid level sensor, be it a discrete or a continuous sensor, for example to the fuel tank of the vehicle or other fluid containing tanks. It should, therefore, be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An automotive system comprising:
  a tank;
  a discrete fluid level sensor configured to output a signal representative of whether a fluid level within the tank exceeds a discrete filled level threshold; and
  an Electronic Control Unit connected to the fluid level sensor, the Electronic Control Unit configured to:
    monitor the signal from the fluid level sensor representative of the fluid level in the tank exceeding the discrete filled level threshold;
    filter the fluid level signal value using a first filter to obtain a first filtered signal and using a second filter to obtain a second filtered signal, the first filter having a first time constant lower than a second time constant of the second filter;
    calculate an integral value of a difference between the first filtered signal and the second filtered signal;
    determine that the tank has been filled with fluid at any point during a driving cycle when the integral value is greater than a predefined threshold; and
    transmit a signal representing that the tank has been filled with fluid at any point during the driving cycle when the integral value is greater than the predefined threshold to express that the fluid level within the tank exceeds the discrete filled level threshold.

2. An automotive system as in claim 1, wherein the Electronic Control Unit is configured to generate the signal representing that the tank has been filled when the integral value is greater than the predefined threshold for a predetermined interval of time, the Electronic Control Unit being configured to control a vehicle parameter based on the signal.

3. An automotive system as in claim 1, wherein the Electronic Control Unit is configured to initiate a learning procedure in order to learn a new fluid level value using the value of the monitored first filtered signal when an increase in the fluid level in the tank is detected.

4. An automotive system as in claim 3, wherein the Electronic Control Unit is configured to perform the learning procedure by monitoring the first filtered signal; calculating an absolute value of the difference between the first filtered signal and the second filtered signal; and setting the monitored second filtered signal as a new fluid level value learned when the absolute value is lower than a predefined threshold thereof.

5. An automotive system as in claim 4, wherein the Electronic Control Unit is configured to set the monitored first filtered signal as a new fluid level value learned when the absolute value is lower than a predefined threshold thereof for a predetermined interval of time.

6. A method of detecting a variation of a fluid level in a tank, the tank being equipped with a discrete fluid level sensor, the method comprising:
  monitor a signal value representative of whether a fluid level in the tank exceeds a discrete filled level threshold;
  filtering the fluid level signal value using a first filter to obtain a first filtered signal and using a second filter to obtain a second filtered signal, the first filter having a time constant ($\tau 1$) lower than a time constant ($\tau 2$) of the second filter;
  calculating an integral value of a difference between the first filtered signal and the second filtered signal;
  determining that the tank has been filled with fluid at any point during a driving cycle when the integral value is greater than a predefined threshold; and
  transmitting and expressing a signal representing that the tank has been filled with fluid at any point during the driving cycle when the integral value is greater than the predefined threshold;
  expressing that the fluid level within the tank exceeds the discrete filled level threshold; and
  controlling a vehicle parameter based on the signal.

7. A non-transitory computer-readable medium storing a computer program comprising a computer-code suitable for performing the method according to claim 6.

8. An automotive system comprising:
  an internal combustion engine managed by an engine Electronic Control Unit; and
  a tank equipped with a discrete fluid level sensor for sensing whether a fluid level exceeds a discrete filled level threshold;
  wherein the Electronic Control Unit being is connected to the fluid level sensor, the Electronic Control Unit being configured to:
    monitor a signal value representative of whether a fluid level in the tank exceeds the discrete filled level threshold;
    filter the fluid level signal value using a first filter to obtain a first filtered signal and using a second filter to obtain a second filtered signal, the first filter having a time constant ($\tau 1$) lower than a time constant ($\tau 2$) of the second filter;
    calculate an integral value of a difference between the first filtered signal and the second filtered signal;
    transmit a signal representative of the detection of an increase in the fluid level in the tank when the integral value is greater than a predefined threshold; and
    express that the fluid level within the tank exceeds the discrete filled level threshold.

9. An automotive system according to claim 8, wherein the tank is a Diesel Exhaust Fluid tank, the automotive system being configured to detect if a refill has been done based on the Electronic Control Unit expressing that the fluid level exceeds the discrete filled level threshold, the automotive system being configured to disable inducement strategies if a refill has been done.

* * * * *